INVENTOR,
Russell R. Hays.
BY Roy E. Hamilton,
Attorney.

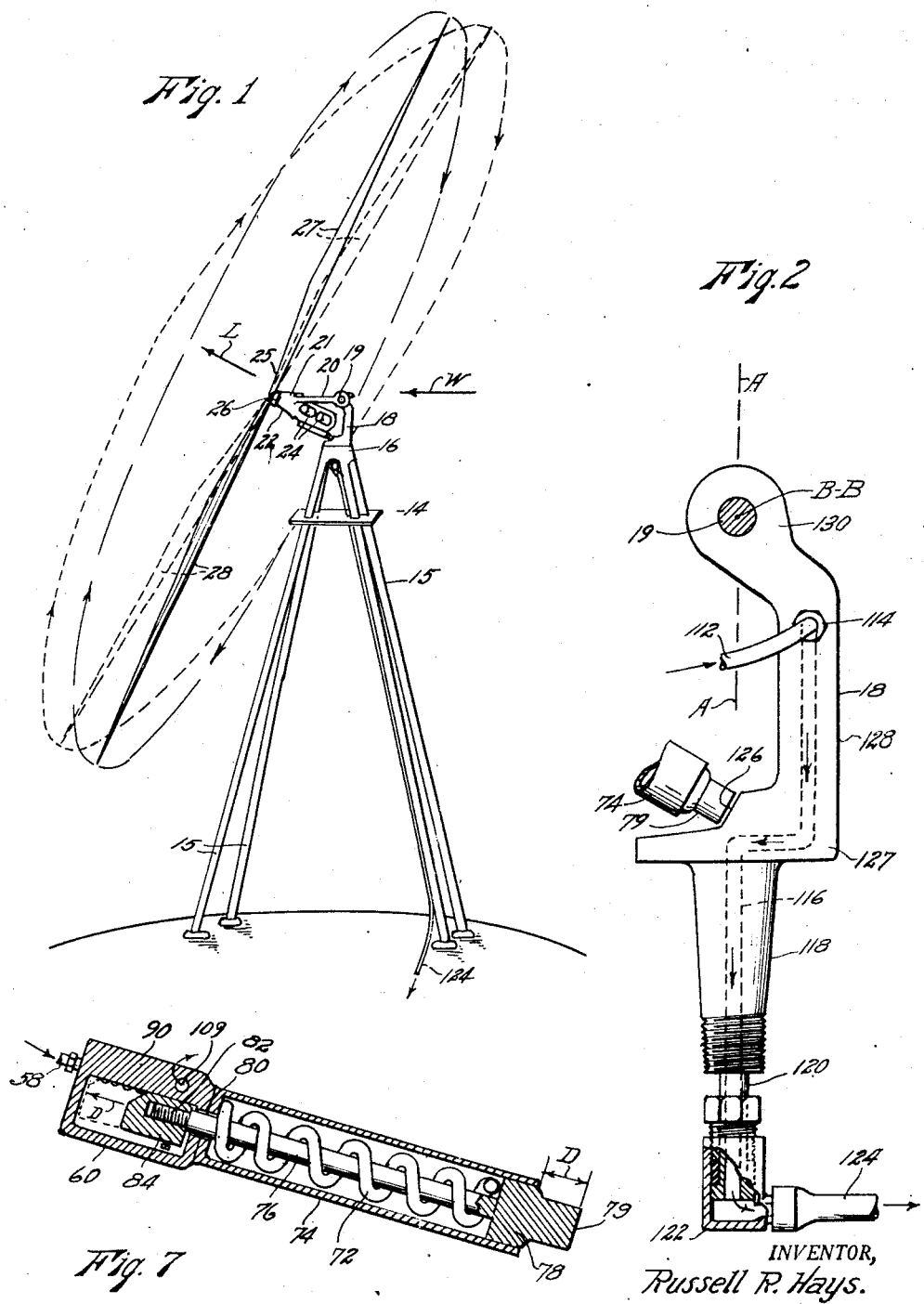

Oct. 11, 1949.  R. R. HAYS  2,484,291
WIND ROTOR

Filed July 13, 1945  4 Sheets-Sheet 3

INVENTOR,
Russell R. Hays.
BY
Roy E. Hamilton,
Attorney.

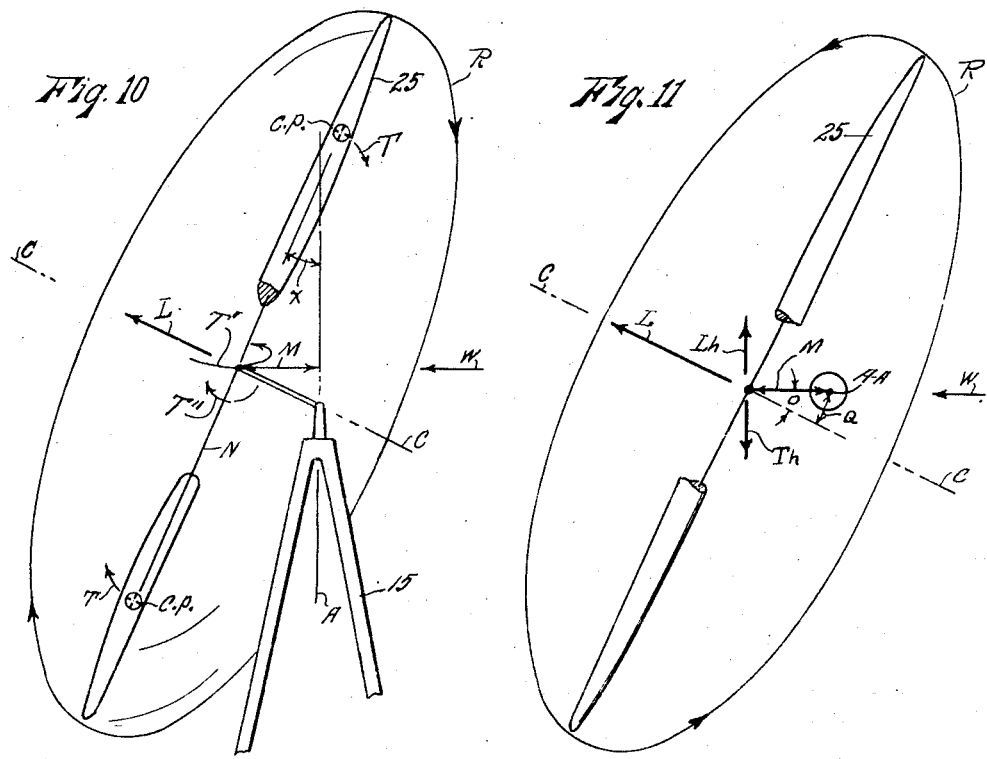
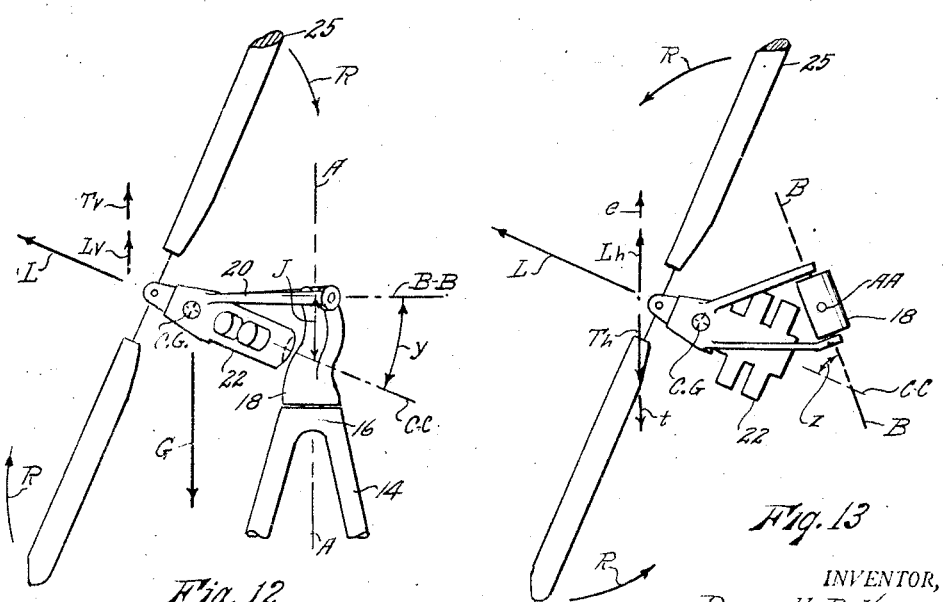

Patented Oct. 11, 1949

2,484,291

UNITED STATES PATENT OFFICE 2,484,291

WIND ROTOR

Russell R. Hays, Lawrence, Kans.

Application July 13, 1945, Serial No. 604,965

6 Claims. (Cl. 230—60)

This invention relates to wind rotors used for obtaining power from the wind, and more particularly to the mounting of such a rotor on a tower and for the direct operation of an air compressor mounted as a unit with the rotor hub.

While the term rotor is used loosely to describe any rotating airfoil system, it has come to have a more specific meaning in the field of aeronautics in that it defines a lifting propeller or horizontally disposed airfoil system in which the blades are mounted for free rocking action about an axis transverse to their axis of rotation in response to airflow dissymmetry arising when operating in yaw. This rocking or "flapping" acts to equalize the lift on the blades at opposite phases of rotation, and thus permits operation of a rotor at large angles of yaw without producing an excessive overturning couple.

In this invention it is proposed to use such a rotor, not alone because initial tilting of it with respect to the vertical permits the use of a smaller and lighter supporting tower such as described in co-pending application Serial No. 559,454 (Patent No. 2,454,058, dated November 16, 1948), but also to damp out unbalanced forces arising through sudden changes in the direction and velocity of the wind. This latter permits greatly reduced structural strength in both the rotor and the supporting tower. In attaining this end it is further desirable that the rotor function as a vane for maintaining it in the wind and also for turning it partially out of the wind when the latter's velocity becomes excessive.

The latter end is achieved not alone by mounting the rotor downwind with respect to the supporting tower, but also by twisting its plane of rotation with respect to a vertical plane containing its center of thrust and the pivot axis of the head on which it is mounted. Twisting a tilted rotor in this manner and offsetting it from the head pivot are necessary for balancing the torque couple resultant to the initial tilting from the vertical which acts to throw the rotor out of the wind. The mechanical principle involved is broadly similar to that used in a conventional single rotor helicopter for balancing the torque couple by tilting the rotor to obtain a lateral component of the thrust.

If for the moment we assume that a wind rotor has been initially tilted, twisted, and offset with respect to the tower head on which it is mounted so that it tends, when supplying a useful torque, to maintain its plane of rotation substantially transverse to the direction of the wind, we may then consider broadly some of the problems arising in response to sudden fluctuations in both velocity and direction of the wind. Basically a rotor is a gyroscopic mass, and unless provision is made for damping of movement about three transverse axes, forces arising on it in response to sudden movement tend to be passed on in their entirety to the supporting structure. This alone would be reason for incorporating an axis transverse to the pivot shaft of the supporting head to permit limited vertical movement of the rotor assembly. In this instance, however, such a transverse head shaft is also utilized to automatically synchronize the compressor load with the power available.

The reason such synchronization is necessary is because the power generated by a wind rotor varies as the cube of the wind velocity, whereas the forces effective on the rotor itself vary only as the square of the wind velocity. In short, the effect of an increase in wind velocity upon the rotor is two-fold; the thrust on the blades increases as the velocity squared, and this in turn acts to increase the rotational velocity of the rotor by an equivalent degree. Since the power absorbed by a conventional air compressor varies roughly as its R. P. M. it follows that power generated in excess of the wind velocity squared is largely dissipated by increasing the rotational speed of the rotor to produce inefficient and even negative attack angles at the blade tips.

The obvious solution to this problem is one of increasing the capacity of the compressor coincident with an increase in the velocity of the wind. This end is achieved by using a multiple cylinder compressor and successively closing bleeder valves from these cylinders as the available power increases. Such an arrangement further permits instantaneous loading and unloading of the rotor which has been found to be highly desirable both in starting it and when a gust of wind suddenly dies away. Synchronization of the bleeder valves with the power delivered by the rotor might be achieved by the use of an ordinary centrifugal governor were it not for this need to quickly unload and load the rotor irrespective of its rotational speed. This latter condition arises, for instance, when the wind suddenly dies. Because of its rotational speed and the mass of the blades the inertia of the rotor continues to supply a large torque to the compressor, and hence this torque is effective at the rotor hub to turn it out of the wind. The lift force opposed to this torque couple has meantime ceased due to stoppage of the wind with the result that the rotor pivots about the main pivot shaft unless a throwout be used to stop the torque to the compressor at the same time.

By horizontally hinging the inner end of the offsetting arm on which the rotor unit is mounted, variations in lift of the rotor may be utilized directly for raising and lowering the arm, and this in turn used to throw the bleeder valves of the compressor. However, since raising of the arm acts directly to increase the initial tilt of the rotor to the vertical, and hence the value of the torque couple available for turning the rotor out of the wind, it follows that it is necessary to simultaneously twist the rotor by an amount sufficient to increase the horizontal lift component opposed to this couple by an equivalent degree. This end is achieved by canting the horizontal hinge axis relative to the rotor disc so that the desired increase in the horizontally acting component is automatically obtained with lifting of the offsetting arm.

With these general considerations in mind the specific structure and refinements thereof for achieving these ends may be more clearly defined. Accordingly, the objectives of this invention may be defined as:

1. The provision of a wind rotor operating in yaw and mounted on an offsetting arm from the unit's main pivoting axis and with the rotor's axis of rotation canted with respect to this offsetting arm by such a degree that a torque couple tending to swing the rotor out of the wind is balanced by a horizontal component of the lift on the rotor acting through a moment arm defined by the offsetting arm on which the rotor unit is mounted.

2. The provision of an offsetting arm carrying a wind rotor compressor unit which is affixed by a hinge to the main pivot head to permit relative raising and lowering of the arm and the unit carried by it.

3. Provision of a wind rotor-compressor unit in which a planetary gear unit intermediate the rotor drive shaft and a multiple cylinder compressor steps up the R. P. M. of the rotor drive shaft in driving the compressor to permit the use of a smaller compressor and to more evenly distribute the compressor load during the single revolution of the rotor.

4. Provision of a hinged off-setting arm with such a rotor-compressor unit mounted on its extending end and having stops at its inner end to limit downward movement of the arm with the result that the weight of the unit acts to damp upward movement of the extending end of the arm in response to lift, torque, and gyroscopic forces tending to raise it during operation.

5. Provision of a hinged off-setting arm for carrying a rotor-compressor unit the hinge of which is normally in a horizontal plane and canted with respect to the rotor disc so that raising of the unit tends to twist the rotor with respect to the head pivot as well as farther tilt the rotor with respect to the vertical.

6. Provision of a compression spring for damping downward movement of a rotor-compressor unit mounted on an off-setting arm, and urging it through a limited degree of upward movement, and a pushrod operated by the compression spring which acts to successively close bleeder valves of the compressor cylinders with upward travel of the offsetting arm and to close them in the same order during downward travel.

7. Provision of a wind rotor-compressor mounted on an offsetting arm and canted laterally thereto to provide a horizontal component of the rotor lift effective as a vane opposed to torque forces tending to turn the rotor out of the wind, and becoming increasingly effective when the power available from the wind exceeds the compressor capacity so that it acts to pull the rotor out of the wind in the direction of this horizontal lift component.

8. Provision of a hinged offsetting arm carrying a rotor-compressor unit movement of which is automatically responsive to wind velocity variations and automatically maintains the bleeder valves of the compressor open until the rotor initially builds up speed in starting; and when in operation automatically opens these bleeder valves when the thrust or lift on the rotor decreases to that of the initial bleeder valve closing position.

Ancillary objectives such as the provision of a compact rotor-compressor unit, bleeder valves and a push rod for opening them, check valves for each cylinder, means for carrying the compressed air through the main pivot shaft and the like, will be clarified by the following description taken in conjunction with the accompanying drawings in which:

Figure 1 is a perspective view in elevation illustrating in dotted lines variation in the tilt and twist angles of a wind rotor such as that embodied in this invention.

Fig. 2 is an enlarged view in side elevation of the crown pivot and the transverse bearing on which the rotor compressor unit is mounted.

Fig. 7 is a cross-sectional view of the bleeder valve throw spring taken along the line 7—7 of Fig. 4.

Fig. 10 is a diagrammatic sketch taken in perspective of the wind rotor shown in Fig. 1 in which the torque couples arising in response to tilting and twisting of the rotor are shown.

Fig. 11 is a diagrammatic sketch taken from above the rotor in Fig. 10 in which are shown the forces required to prevent rotation of a tilted rotor about the crown pivot.

Fig. 12 is a diagrammatic sketch in side elevation of a rotor-compressor unit illustrating the damping action of the unit to forces arising through tilt and twist of the rotor relative to the crown pivot.

Fig. 13 is a diagrammatic plan form sketch of the rotor-compressor unit taken from above Fig. 12 in which is shown the effect of canting the transverse crown pivot to maintain balance between the forces effective upon the unit with movement about the transverse pivot.

Figure 3:
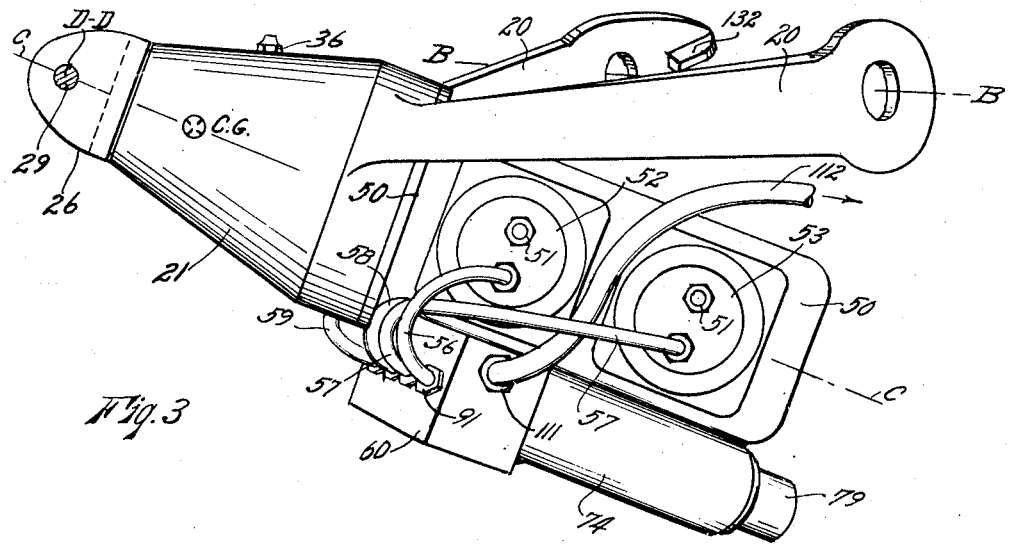
Fig. 3 is a view in side elevation of the rotor bearing-compressor unit.

Referring to the drawings, the legs 15 of a conventional steel tower 14, Fig. 1, converge into a crown bearing 16 which carries the pivotally mounted crown or head 18 to which is hinged the free journaled ends of the horizontally extending arms 20 rigidly secured at their outer ends to the bearing case 21 of the rotor bearing-compressor unit 22 the outer end of which comprises a hub 26 on which is mounted a conventional rotor 25 having interconnected blades 27 and 28 such as those shown and described in Patent No. 2,369,048. In this type of windmill, usually referred to as a highspeed wheel and having a tipspeed ratio of 3. or better to distinguish it from the slower, higher solidity wheels having tipspeed ratios of 2. or less, the pitch of the blades is quite small and consequently an aircraft rotor suitable for auto-rotative descent is easily converted to such a windmill by slightly varying the pitch of the blades.

Figure 4:
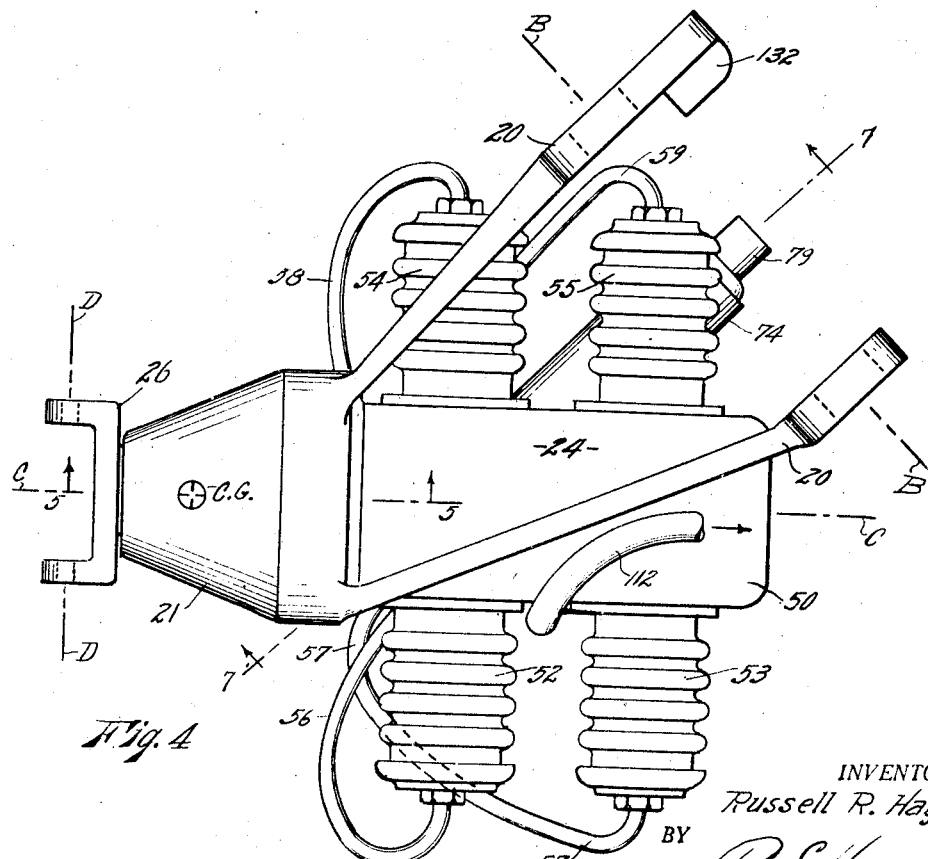
Fig. 4 is a view taken from above of the unit shown in Fig. 3.
Figure 5:
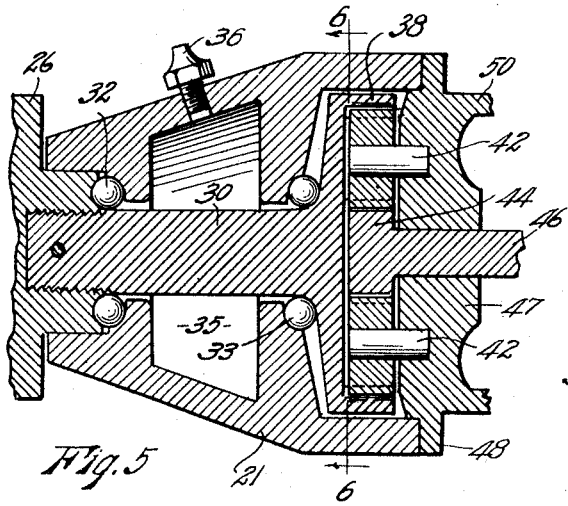
Fig. 5 is an enlarged sectional view of the rotor bearing and planetary gearing which drives the compressor shown in Fig. 4 taken along line 5—5 of this figure.
Figure 6:
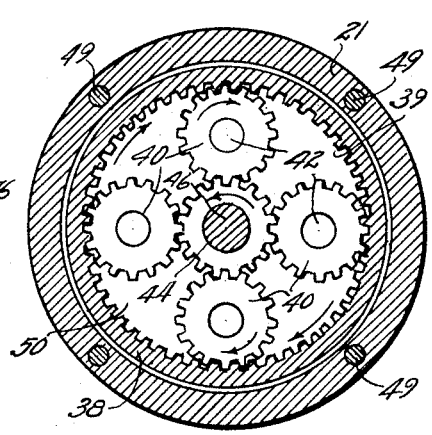
Fig. 6 is a cross sectional view of the planetary gearing of the rotor-compressor unit taken along the line 6—6 of Fig. 5.

The torque produced by the rotor 25 is transmitted through the pivotal mounting 29 to the hub 26, Figs. 3, 4, and 5, solidly affixed to the rotor shaft 30 carried by combination bearings 32 and 33 of the bearing case 21 having a grease chamber 35 intermediate the bearings 32 and 33 and filled through the alemite fitting 36. The inner end of the shaft 30 carries a bell gear 38 the internal teeth 39 of which are contacted by planet gears 40, Fig. 6, mounted on stub shafts 42 carried in the compressor crank case 50 which drive the sun gear 44 fixed to the extending end of the compressor crankshaft 46 carried by the compressor main bearing 47 aligned with rotor bearings 32 and 33. The forward face 48 of the compressor crankcase 50 is fixed to the bearing case 21 by suitable bolts 49 and serves to maintain alignment of shafts 46 and 30 to make a single compact unit of the compressor 24, bearing case 21 and gears 38, 40 and 44.

The purpose of the gears is two-fold. In the first place they step up the R. P. M. of the rotor shaft 30 and thus permit the use of a considerably lighter compressor than would otherwise be required to absorb the available torque. The second factor is that the load on a compressor is greatest during the compression stroke and this gives rise to periodic movement of an anticulatively mounted rotor-compressor unit which becomes quite noticeable when the compressor is turned directly by the rotor. By increasing the number of compressor impulses per rotor R. P. M. the magnitude of these impulses is decreased by a like degree and a marked increase in the smoothness of operation results.

The compressor 24 has multiple cylinders 52, 53, 54 and 55 with exhaust lines 56, 57, 58 and 59 respectively connecting them directly to bleeder valves 62, 63, 64 and 65 respectively carried in the valve throw box 60. Air inlet valves 51 of each cylinder are normally connected with an air filter, not shown, by lines similar to 56—59. The purpose in having multiple cylinders on the compressor 24 is that of extending the range over which the compressor can completely absorb the power generated by the rotor 25. Since the power available increases as the cube of the wind velocity, whereas the power absorbed by a single cylinder 52 increases only as the square of the wind velocity, it follows that where air is delivered at a constant pressure the capacity of the compressor should also be variable directly as the wind velocity. Hence, if the rotor be designed to carry one cylinder in a wind of 8 M. P. H., two cylinders will be required to carry the load at 16 M. P. H. and all four cylinders will be needed when the wind velocity reaches 32 M. P. H. at which time the volume of air delivered will be in the neighborhood of 32 times that delivered at 8 M. P. H., less an amount arising as a result of decreased compressor efficiency resultant to more rapid operation.

Variation in the capacity of the compressor 24 is synchronized with variations in wind velocity by reason of variation in the lifting force L acting on the rotor. The force L will vary substantially as the wind velocity squared and when its line of action which is more or less coincident with the axis C—C of of the rotor shaft 30 lies below the transverse crown axis B—B, it will exert a force $L_v$, Fig. 12, tending to rotate the entire rotor-compressor unit upward and about the axis of B—B. This force $L_v$ is opposed by the weight G of the unit which is normally of considerably greater magnitude. However, by counterbalancing the weight G of the unit by a variable tension compression spring 72 carried in a cylindrical case 74 integral with the valve throw box 60 which forms its outer end and is solidly affixed to the bottom of the compressor crankcase 50, the entire rotor-compressor unit can be caused to swing away from the head 18 in response to rotor lift variations by a predetermined degree, which incidently produces a slight increase in the tilt angle of the rotor as illustrated in Fig. 1.

Figure 9:
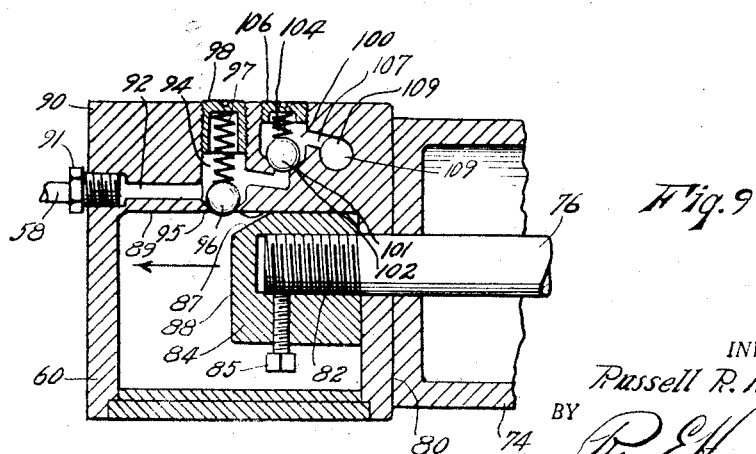
Fig. 9 is an irregular, somewhat diagrammatic vertical section taken along the line 9—9 of Fig. 6.

Considering the valve throw mechanism more in detail Fig. 7, a pushrod 76 carries on its inner end a piston 78 which contacts the inside wall of the spring case 74 and projects therefrom as a push arm 79 which normally contacts the step 126 of the head 18. The pushrod 76 passes through the compression spring 72 and through the opposite end 80 of the spring case 74, being threaded on its extending end 82 into the push plate 84, Fig. 9, where its length and hence the initial tension of the compression spring 72 may be adjusted after which it is locked in position by setscrew 85. It is thus apparent that the compression spring 72 is effective in pushing the rotor-compressor unit away from the head 18 and about the axis B—B through the distance D, Fig. 7, after which movement of the pushrod 76 and hence the spring 72 will be restrained by the push plate 84 contacting the outer face of the cylinder end 80. Hence the tension of the spring 72 can be predetermined and the adjustment made of the respective parts such that with a wind velocity of, for instance, 8 M. P. H., the lift L of the rotor will be sufficient to swing the rotor-compressor unit away from the head 18 through an arc of D/4, at 16 M. P. H. through an arc of D/2, and so progressively on out until the push plate 84 contacts the end of the spring case, after which the tension of the spring 72 will no longer be effective in counterbalancing the weight G of the unit.

This motion of the push plate 84 is utilized directly for opening the staggered bleeder valves 62, 63, 64 and 65 carried in the upper wall section 90 of the valve box 60. The purpose of the bleeder valves is to prevent compression of air in the cylinders of the compressor until there is rotor torque sufficient to handle it. In short, all the bleeder valves are open when the wind rotor 25 is idle and the spring 72 is taking its maximum compression load. Taking the bleeder valves individually, the airline 58 leading from compressor cylinder 54 is connected with the passage 92 in the valve box 60 by means of a conventional tubing connection 91, Fig. 9. The vertical well 94 drilled in section 90 and connecting with passage 92 ends in valve seat 95 flush with the face 89 of valve box wall section 90 on which pushplate 84 rides, and the ball 96 seating in valve seat 95 normally projects past the plate face 89 so that rearward movement of pushplate 84 acts to raise it off its seat 95, thus permitting air to escape from compressor cylinder 64. With forward movement of pushplate 84, the coiled spring 97 carried in the well 94 by hollow plug 98 seats the ball 96 in the bleeder valve seat 95. With closing of valve 95 air from cylinder 64 continues down the passage 92 and through the well 94 to the check valve well 100 the bottom of which also comprises a valve seat 101 seating ball 102 which is normally held in a seated position by compression spring 104 carried by the hollow plug 106. Hence when air from cylinder 64 raises ball valve 102 it is led from well 100 through passage 107 into the main air gathering passage 109 having outside fitting 111 connecting it with the flexible air line 112.

Figure 8:
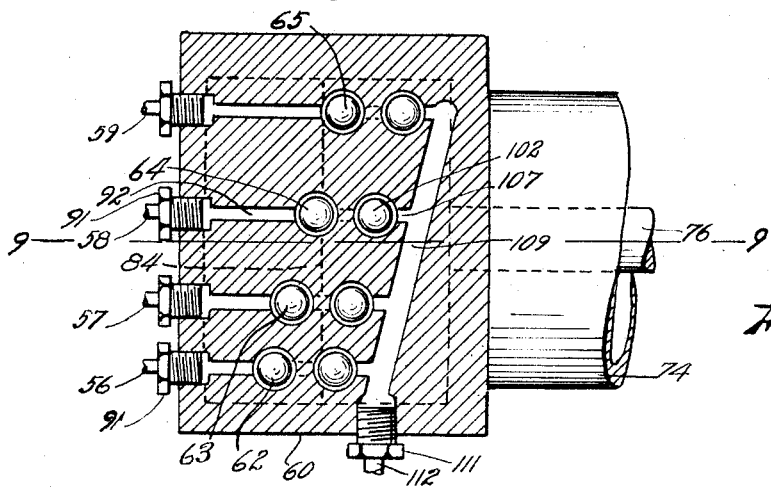
Fig. 8 is an irregular diagrammatic sectional plan view of the leads to the bleeder valves and the check valves through which they open into the main air line.

In this instance the bleeder valves 62, 63, 64 and 65 are located diagonally in the upper section 90 of the valve throw box 60, Fig. 8, with respect to the transverse bull-nose lip 87 at the rear face 88 of the push plate 84, the width of the latter being such that all valves are held open when the push plate attains the maximum travel rearwardly, and successively close with forward travel of plate 84 through the action of springs 97 until all are clear of push plate 84 when it reaches the limit of its forward travel. Air under compression passing through flexible tube 112 is conducted into the passageway 116 by fitting 114 at the inner end of tube 112 and is led down through the center of the vertical pivot shaft 118 mounted in suitable bearings in the crown 16 of tower 14, a smaller extension 120 of shaft 118 being seated in a conventional packing gland and rotatable chamber combination 122 fitted to conduit tube 124 by which it is conducted down a leg of tower 14 to a storage reservoir such as that described in co-pending application Serial No. 559,454.

The body 129 of pivotally mounted head 18 on which the rotor compressor unit 22 is mounted by arms 20 carrying transverse shaft 19 mounted in transverse head bearing 130 at its top is formed out of alignment with its pivotal axis A—A to provide clearance for the unit 22 and its base 127 cut in a step 126 which contacts the extending end 79 of pushrod 76. When the unit 22 is raised through large angles with respect to the head 18, a stop 132 on one of the unit arms 20 contacts the body 128 of the head to prevent extreme upward travel of the unit induced by sudden changes in wind velocity above the rotor's normal range of operation.

The precise position of the rotor-compressor unit 22 with respect to the pivotal head 18 to provide balance between torque and lift forces effective upon the unit during operation, are dependent upon the lift torque curve of the particular rotor used, but the angular relationships required to obtain such balance in the rotor are basically the same for all units of this type. Referring to Fig. 10, the rotor 25 is seen during operation to have two characteristic forces created upon it in response to the force of the wind W. The greater of these is a lift force L acting more or less in alignment with the rotor's axis of rotation C—C, and a lesser torque force in the rotor's plane of rotation acting to turn it and to supply a useful torque T which may be considered as acting through the blade's center of percussion c. p. and having a moment arm N which is the distance of the c. p. from the rotor axis C—C.

With tilting of the rotor 25 from the vertical and hence through an angle X to the pivotal axis A—A, the torque T absorbed by the compressor 24 developes a horizontally acting component T' equal to the sine XT, which referred to the pivotal axis A—A, Fig. 11, becomes the force $T_h$ having a moment arm M which is the distance of the rotor 25 from the pivotal axis A—A. To prevent the rotor being pulled out of the wind by the force $T_h$ the rotor 25 is twisted laterally with respect to the offsetting arm 20 through an angle O, so that the rotor lift L has a moment arm Q relative to the pivotal axis A—A. The horizontally acting lift component $L_h$ resultant to such twisting of the rotor is seen to equal $T_h$ when:

$$\text{Sine } XT\frac{N}{M} = \cos.OLQ$$

and the rotor tends to maintain itself transverse to the wind despite the fact that it is tilted from the vertical.

When we take a rotor initially balanced in this fashion and mount it for movement about a horizontal axis B—B, which in this instance intersects axis A—A, Fig. 12, several things happen. For one thing, lateral twisting of the rotor with respect to the offsetting arms 20 produces a vertical component T'' of the torque T which referred to the axis B—B becomes a vertical force $T_v$ having the moment arm M. This acts to raise the unit 22 about the axis B—B and is resisted by the unit's weight G acting through its center of gravity c. g. Since the force $T_v$ varies directly as the torque utilized by the compressor 24 it is not desirable to use it for throwing the compressor bleeder valves. Instead, a vertical component $L_v$ of the lift L is made available by raising the axis B—B with respect to the lift axis C—C, thus giving the lift L a moment arm J with respect to the axis B—B which referred to the center of the rotor becomes a vertical component $L_v$ of the lift L having a moment arm M which tends to raise the unit 22, and is restrained by the latter's weight G as is the vertically acting torque component $T_v$.

In general the weight G of the unit 22 should be slightly greater than $T_v$ and $L_v$ combined when all four cylinders of the compressor 24 are in operation, and $T_v$ should be less than G minus the maximum tension of compression spring 72, when the rotor is carrying its peak load since otherwise with a sudden drop in wind velocity the compressor bleeder valves would not be thrown to give the equivalent of free wheeling of the rotor.

With raising of rotor-compressor unit 22 by increase in the vertically acting components of lift and torque effective upon the rotor, the direct effect is one of increasing the tilt angle of rotor 25 with a subsequent increase in the horizontal torque component $T_h$, but when the hinging axis B—B is parallel to the plane of the rotor disc there is no associated increase in the horizontal lift component $L_h$. In order that $L_h$ may increase by an equivalent degree to maintain balance of the system, the axis B—B of the offsetting arm 20 is canted in a horizontal plane oppositely to the direction of rotor twist through an angle Z, which for the conditions set up in this instance is an angle of about 45°. As a result of this canting, raising of the unit 22 produces an increase in the twist angle O of the rotor thereby increasing $L_h$ by an amount (e) substantially equal to the simultaneous increase of T_h by the amount (t), Fig. 13.

While a great deal of variation in the value of the angularity required to obtain balancing of the rotor forces is to be expected, inasmuch as the lift/torque ratio varies widely with different rotors, the principle involved remains the same. For example, with rotors having a high lift-torque ratio the value of the twist angle O will be decreased. Or if it is desirable to lengthen the offsetting arms 20, the twist angle O and the included angle Y may be decreased, and the hinge angle Z increased. Normally an increase of 5° of the tilt angle X of the rotor through raising of the unit 22 should be adequate for closing all the bleeder valves, but greater or less travel may be used, dependent upon the weight of the rotor-compressor unit which may be plotted as a lift/weight ratio in computing the angularity desired.

In operation, too short an offsetting arm 20 makes the rotor sluggish in following the wind. This is not desirable, since a well balanced rotor will operate for a considerable period in an upwind position and rotating backwards before swinging around into a downwind position and reversing its direction. With suitable length to the offsetting arm 20, the rotor swings slowly into a downwind position before beginning to turn. Since the power produced in wind velocities under 8 M. P. H. is insignificant, and since the efficiency of the rotor is of a low order until after it obtains its rated tipspeed ratio it is desirable that no load be imposed upon it at speeds less than 8 M. P. H. Hence, the bleeder valves are maintained open until the lift L at this wind velocity raises the unit 22 and the push-plate 84 moves forward to let one of the bleeder valves close. This preliminary revving up is particularly desirable since the compressor usually has to buck pressure in the air line 124. What actually occurs is that due to its twist, the lift on the rotor acts to pull it into a position slightly transverse to the wind while free-wheeling, and with closing of the bleeder valve the torque then pulls it directly into the wind. Imposition of the torque load acts to slow the rotor slightly and decrease $L_v$ but the torque $T_v$ comes into being at the same time and acts to maintain the unit 22 in its initially raised position. And it is obvious that the relative values of $T_v$ to $L_v$ required to obtain smooth transition from free-wheeling may be varied by variation in the value of the distance J through raising or lowering of the unit 22 with respect to the hinge axis B—B. This same operation is repeated in the closing of the remaining bleeder valves.

It will be observed that the compression throw spring 72 is initially placed under tension by the pushrod 76. The purpose of this is that after all the bleeder valves have been opened, the damping value of the weight of unit 22 is abruptly increased by the amount of this initial tension. Thus, the tilting increase of the rotor is normally limited to the throw of the spring 72, but freedom of the unit 22 to raise in response to overloads is still possible. These are of two types. One occurs with sudden shifts in the wind when the unit 22 raises slightly, evidently in response to some gyroscopic force the exact nature of which is not known. The other overloads occur when the wind velocity becomes excessive, which in this case is at air speeds above 32 M. P. H. Above this speed the lift L of the rotor increases more rapidly than the torque utilized by the compressor with the result that unit 22 is raised and at the same time the lift component $L_h$ acts to pull the rotor slightly out of the wind.

With gradual dying of the wind the inertia of the rotor provides a lag to the torque so that the latter pulls the rotor slightly out of the wind. When the wind suddenly dies, however, as is often the case, the unit 22 drops down, compressing the spring 72 and opening the bleeder valves from the compressor so that the rotor free-wheels. If for any reason free-wheeling does not take place, the rotors's inertia acting through the torque swings the rotor unit around into an upwind position, or may even cause it to make a complete revolution about the axis A—A, but in either case causes no undue stresses or breakage of parts.

As many changes could be made in carrying out the above construction without departing from the scope of the invention, it is intended that all matter contained in the above description or shown in the accompanying drawings shall be interpreted as illustrative and not in a limiting sense.

Having thus described my invention, what I claim as new and desire to be secured by Letters Patent is:

1. In a wind rotor-compressor unit for converting wind energy to a contained constant pressure airstream, a tower, a pivotal mounting for said unit on said tower providing freedom for the rotor of said unit to assume a downwind position with respect to said tower, a second pivotal mounting intermediate said tower and said unit canting said unit with respect to said first pivotal mounting and permitting limited movement of said unit in response to a vertical component of the lift effective upon said rotor and means operatively associated with said second pivotal mounting for simultaneously varying the torque loading of said rotor.

2. In a wind rotor-compressor unit for converting wind energy to a contained constant pressure airstream, a tower, a pivotal mounting for said unit on said tower providing freedom for the rotor of said unit to assume a downwind position with respect to said tower, a second pivotal mounting intermediate said tower and said unit canting said unit with respect to said first pivotal mounting and permitting limited movement of said unit in response to a vertical component of the lift effective upon said rotor and means operatively associated with said second pivotal mounting, including a multiple cylinder air compressor and bleeder valves successively opened and closed in response to said limited movement of said unit whereby the capacity of said compressor is automatically varied in response to lift variations on said rotor.

3. In a wind rotor-compressor unit for converting wind energy to a contained constant pressure airstream, a tower, a pivotal mounting for said unit on said tower providing freedom for the rotor of said unit to assume a downwind position with respect to said tower, a second pivotal mounting intermediate said tower and said unit canting said unit with respect to said first pivotal mounting and permitting limiting movement of said unit in response to a vertical component of the lift effective upon said rotor and means operatively associated with said second pivotal mounting, including a multiple cylinder air compressor and bleeder valves successively opened and closed in response to said limited movement of said unit, and variable tension means directly responsive to the lift of said rotor for maintaining said bleeder valves open at rotor lift values below the rotor's normal operating range whereby said rotor free-wheels to get up its rated tipspeed ratio before having a torque load imposed upon it, and also free-wheels to remove said torque load when said rated tipspeed ratio is exceeded due to a sudden decrease in the velocity of the wind.

4. In a wind rotor-compressor unit for converting wind energy to a contained constant pressure airstream, a tower, a pivotally mounted head for said tower, a transverse shaft carried by said head, a canted offsetting arm pivotally mounted on said transverse shaft, said rotor-compressor unit mounted on said offsetting arm with the axis of rotation of said rotor canted in a vertical plane and passing beneath the axis of said transverse shaft whereby a component of the lift effective upon said rotor during operation tends to lift said unit, said component being resisted by the weight of said unit, and a resilient stop limiting downward travel of said offsetting arm about said transverse head shaft.

5. In a wind rotor-compressor unit for converting wind energy to a contained constant pressure airstream, a variable capacity compressor, a tower, a pivotal mounting for said unit on said tower providing freedom for the rotor of said unit to assume a downwind position with respect to said tower, a tension loaded bar mounted in said unit and means directly responsive to lift variations on said rotor for moving one end of said bar, and means operatively associated with the other end of said bar for varying the capacity of said compressor, whereby the torque requirements of said compressor are synchronized with the power output of said rotor through a wide range of wind velocity variation.

6. In a wind rotor-compressor unit for converting wind energy to a contained constant pressure airstream, a variable capacity compressor, a tower a pivotally mounted head for said tower, a transverse shaft carried by said head, a canted offsetting arm pivotally mounted on said transverse shaft, said rotor-compressor unit mounted on said offsetting arm with the axis of rotation of said rotor canted in a vertical plane and passing beneath the axis of said transverse shaft whereby a component of the lift effective upon said rotor during operation tends to lift said unit, means responsive to said lifting of said unit varying the capacity of said compressor, said component being resisted by the weight of said unit, a flexible conduit connecting said compressor with said head, an air passage centrally disposed along the pivotal axis of said head a packing gland centrally disposed in said tower and communicating with said passageway, and an airline leading from said tower communicating with said packing gland.

RUSSELL R. HAYS.

REFERENCES CITED

The following references are of record in the file of this patent:

UNITED STATES PATENTS

| Number | Name | Date |
| --- | --- | --- |
| 485,881 | Perry | Nov. 8, 1892 |
| 498,989 | Perry | June 6, 1893 |
| 563,794 | Verne et al. | July 14, 1896 |
| 924,060 | Hards | June 8, 1909 |
| 1,000,690 | Pichault | Aug. 15, 1911 |
| 1,035,431 | Ericson | Aug. 13, 1912 |
| 1,254,737 | Smithey | Jan. 29, 1918 |
| 1,255,998 | Fahle | Feb. 12, 1918 |
| 1,299,151 | Ebert | Apr. 1, 1919 |
| 1,369,596 | Yanacopoulos | Feb. 22, 1921 |
| 2,178,047 | Malme | Oct. 31, 1939 |
| 2,360,791 | Putnam | Oct. 17, 1944 |
| 2,369,048 | Hays | Feb. 6, 1945 |
| 2,460,527 | Oliveros | Feb. 1, 1949 |

FOREIGN PATENTS

| Number | Country | Date |
| --- | --- | --- |
| 11,864 | Great Britain | 1847 |
| 601,986 | Germany | Oct. 19, 1934 |